United States Patent [19]

Bohner et al.

[11] Patent Number: 4,890,027

[45] Date of Patent: Dec. 26, 1989

[54] DYNAMIC MOTOR CONTROLLER

[75] Inventors: John J. Bohner, Manhattan Beach; Peter L. Conley, Playa del Rey, both of Calif.

[73] Assignee: Hughes Aircraft Company, Los Angeles, Calif.

[21] Appl. No.: 274,248

[22] Filed: Nov. 21, 1988

[51] Int. Cl.[4] ............................................. H01L 41/08
[52] U.S. Cl. ...................................... 310/328; 310/77; 310/90
[58] Field of Search ..................... 310/77, 90, 328, 323

[56] References Cited

U.S. PATENT DOCUMENTS

| | | | |
|---|---|---|---|
| 3,154,700 | 10/1964 | McNaney | 310/328 |
| 3,292,019 | 12/1986 | Hsu et al. | 310/328 |
| 3,351,393 | 11/1967 | Emmerich | 310/328 X |
| 4,438,363 | 3/1984 | Babitzka et al. | 310/328 |
| 4,600,854 | 7/1986 | Bednorz et al. | 310/328 X |
| 4,629,039 | 12/1986 | Imoto et al. | 310/328 X |
| 4,636,679 | 1/1987 | Glett et al. | 310/328 |
| 4,689,516 | 8/1987 | Yokoyama et al. | 310/328 X |
| 4,705,323 | 11/1987 | Imoto et al. | 310/328 X |
| 4,765,140 | 8/1988 | Imoto et al. | 310/328 X |

Primary Examiner—Mark O. Budd
Attorney, Agent, or Firm—Steven M. Mitchell; Wanda Denson-Low

[57] ABSTRACT

A high performance, lightweight and low cost dynamically controlled motor 10 is disclosed wherein the position control of the motor is accomplished by the use of an electronic braking apparatus 20. The dynamically controlled motor 10 of the present invention includes a standard electric motor 15 controlled by the electronic braking apparatus 20. The electric braking apparatus 20 includes a piezoelectric transducer 50 which can be activated to provide a braking force to the rotor 35. The rotor 35 is rotated to the desired stopping location, then the electronic braking apparatus 20 is activated by activating the piezoelectric transducer 50. The rotor 35 can thereby be held at the desired position.

3 Claims, 3 Drawing Sheets

DYNAMIC MOTOR CONTROLLER

BACKGROUND OF THE INVENTION

1. Field of the Invention:

The present invention relates to dynamic motor control. More specifically, the present invention relates to the control of dynamic motors that are rotated between fixed angles and held stationary at those fixed angles for a specified period of time.

While the present invention is described herein with reference to a particular embodiment for an illustrative application, it is understood that the invention is not limited thereto. Those having ordinary skill in the art and access to the teaching provided herein will recognize additional modifications, applications and embodiments within the scope thereof.

2. Description of the Related Art:

Various braking systems are known in the art. Such braking systems range from mechanical drum or disk brakes to the magnetic braking arrangements of three-phase induction motors.

In the control of dynamic motors it is desirable to maintain the position of a rotor at a specified location for a specified period of time. As is known in the art, a stepper motor uses electromagnetic detents to maintain a rotor at a desired location. Electrical energy must be added to cause the rotor to move past a magnetic hill. When the motor is de-energized, the rotor will settle and be maintained within a magnetic valley. A stepper motor must therefore be designed with these magnetic valleys located at the desired stopping positions. Thus one drawback of stepper motors is the requirement of a large number of detents in order to allow the stepper motor to be held at a large number of positions.

Another drawback of stepper motors is due to the correlation between retaining torque and magnetic friction. That is, the greater the restraining torque, the greater the magnitude of the magnetic hill and accordingly, the greater the force required to turn the rotor past the magnetic hill. Therefore if a large restraining torque is required to hold the rotor and its payload at a desired position, a large force will be required to turn the rotor from one stopping location to another.

A third drawback of stepper motors is due to the fact that as the motor settles in the magnetic valley, the motor shaft may vibrate before coming to rest at the desired location. This vibration could cause damage or excess wear to the motor or to a payload.

The micro-stepper motor offers an improvement over the stepper motor in that it allows a shaft to be held at an indefinite number of positions. The micro-stepper motor operates by applying electrically orthogonal signals to spatially orthogonal poles of a motor. By changing the ratio of magnitude of the signals applied, the motor can be moved to and held at any desired location.

In order to hold the rotor at a desired location, however, electrical energy must be applied constantly. As a result, the performance of micro-stepper motors has been limited by the requirement of a corresponding increase in applied electrical energy for greater restraining torques.

Accordingly, a need has been recognized in the art for a compact, lightweight, inexpensive braking system for dynamic motors with minimal restraining torque energy requirements.

SUMMARY

The shortcomings of the related art are substantially addressed by the dynamic motor controller of the present invention. The invention offers high performance, low cost and low bulk by providing motor control mechanically without the use of a large, heavy brake or high electrical energy requirements. The invention includes a moving body, a frame which is held stationary with respect to the moving body and supports between the moving body and the frame which allow the body to move with respect to the frame. A particularly novel aspect of the invention is the use of a piezoelectric transducer to provide a braking force to the moving body.

DESCRIPTION OF THE INVENTION

Figure 1:
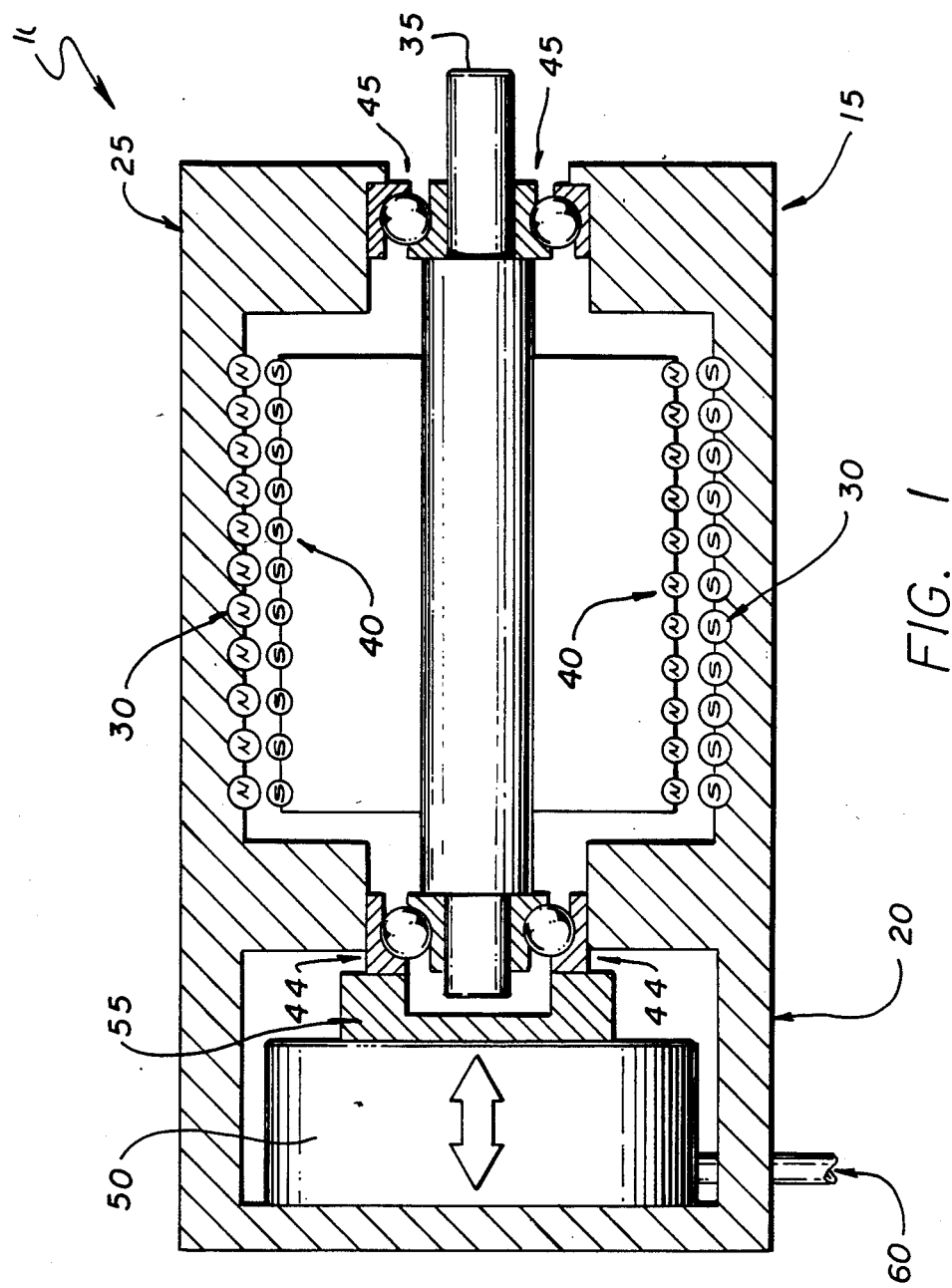
FIG. 1 is a schematic diagram of the dynamically controlled motor of the present invention.

Referring now to the drawings, FIG. 1 is a schematic diagram of a dynamically controlled motor 10 equipped with the electronically controlled braking apparatus of the present invention. The motor 10 includes a standard induction motor 15 and the electronic braking apparatus 20 of the present invention. Those skilled in the art will recognize that any type of electric motor could be used without departing from the scope of the invention. The motor 15 includes a steel, cylindrical motor housing 25 with stator windings 30 embedded therein. The housing 25 is closed at one end. The motor 15 further includes a cylindrical rotor 35 with rotor magnets 40 attached thereto. The rotor 35 is typically made of solid steel or other suitable material. The rotor 35 is suspended within housing 25 by means of a first bearing assembly 44 positioned at the end of the rotor 35 nearest the electronic braking apparatus 20 and a second bearing assembly 45 positioned at the end of the rotor 35 opposite the electronic braking apparatus 20. The bearing assemblies 44 and 45 allow the rotor 35 to rotate freely about its longitudinal axis within the housing 25.

Figure 2:
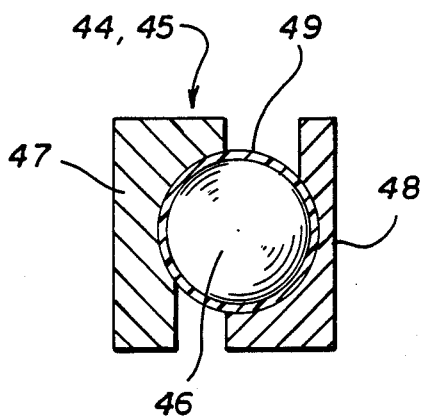
FIG. 2 shows the bearings of the present invention with respect to an inner and an outer race.

FIG. 2 shows a detailed cross section of the bearing assemblies 44 and 45 of the present invention. Each bearing assembly 44 and 45 includes a ball bearing 46 disposed between an annular inner race 47 and an annular outer race 48. The inner race 47 and outer race 48 retain the balls 46 while allowing the balls 46 to rotate freely. The inner race 47 and the outer race 48 are both constructed of steel or other suitably rigid material. The inner surfaces of the inner race 47 and the outer race 48 of the bearing assemblies 44 and 45 and the ball 46 are lubricated with a suitable lubricant 49, graphite for example, in order to decrease the friction between the balls 46 and the inner and outer races 47 and 48 respectively. The rotor 35 is connected to the inner race 47 while the housing 25 is connected to the outer race 48. In this manner, the rotor 35 is suspended within the housing 25 while allowing the rotor 35 to move within the housing 25.

Returning now to FIG. 1, the braking apparatus 20 includes a piezoelectric transducer 50 positioned between the closed end of the housing 25 and a spacer 55. As is known in the art, when a piezoelectric transducer is energized, it expands thereby applying a pressure proportional to an applied voltage. Conversely, a voltage will develop across a piezoelectric transducer proportional to the pressure applied thereto.

The piezoelectric transducer 50 may be made of quartz or other suitable piezoelectric crystal materials. The piezoelectric transducer 50 is flat on two sides which contact the spacer 55 and the housing 25. The spacer 55 is made of steel or other suitably rigid material and is shaped so as to contact the first bearing assembly 44 on one and only one race surface when the transducer 50 is energized.

Electrical connections 60 are provided to the piezoelectric transducer 50 in order to allow the operator to activate and deactivate the braking apparatus 20 when desired via a microprocessor or other control device (not shown). This will produce a voltage proportional to the desired pressure to be applied to the spacer 55. The spacer 55 transfers the force supplied by the piezoelectric transducer 50 to the first bearing assembly 44. As is known in the art, bearing friction is increased as bearing load is increased. The force supplied to the first bearing assembly 44 through spacer 55 causes an increase in the bearing load thereby increasing the bearing friction. This increase in bearing friction causes a braking torque to be applied to the rotor 35. Hence, the braking apparatus 20 may be selectively activated to restrain the rotation of the rotor 35. (It will be appreciated by those skilled in the art that as an extension of the present invention, a second piezoelectric transducer (not shown) can be used to determine the braking force applied to the rotor 35.)

In operation, a payload is connected to the rotor 35. The rotor 35 is rotated by the application of current to the stator windings 30. When the rotor has rotated to the desired position, the piezoelectric transducer 50 of the braking apparatus 20 is activated. In response to the applied voltage, the piezoelectric transducer 50 expands to apply pressure to the spacer 55 which in turn exerts pressure upon the outer race 48 of the first bearing assembly 44. As pressure is exerted upon the outer race 48 of the first bearing assembly 44, a braking torque is realized by the rotor 35.

Figure 3:
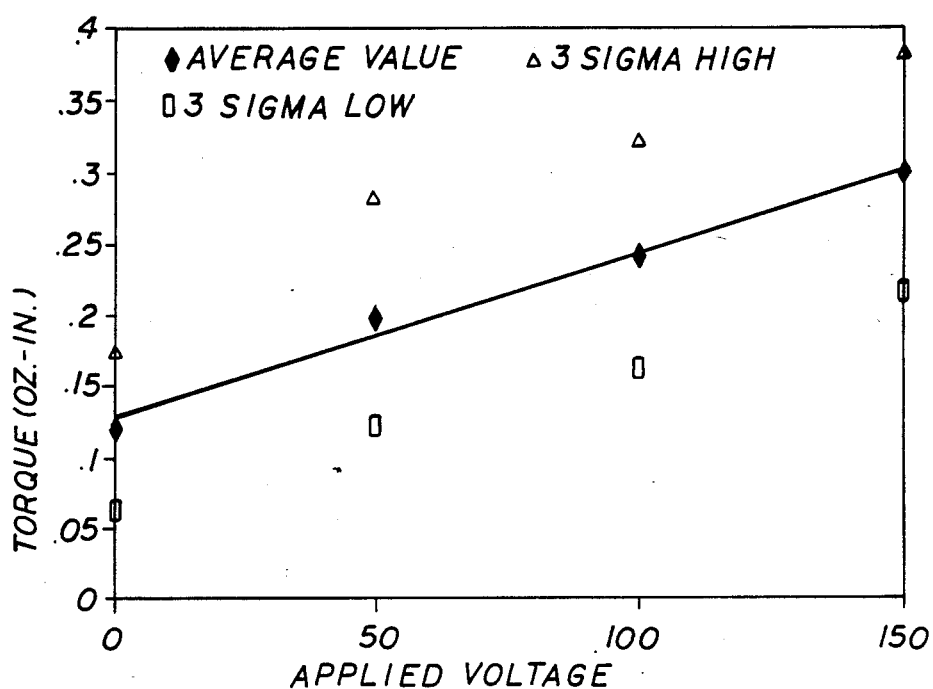
FIG. 3 is a graph showing the linear relationship between the voltage applied to the piezoelectric transducer and the braking torque applied to the rotor of the present invention.

FIG. 3 is a graph showing the linear relationship between the voltage applied to the piezoelectric transducer 50 and the braking torque upon the rotor 35 derived from a non-optimized developmental model. By supplying a sufficient voltage to the piezoelectric transducer 50, the operator can supply a braking torque sufficient to hold the rotor 35 at a desired stopping location. When the rotor 35 has reached a stop at the desired stopping location, the addition of energy to the stator windings 30 of the induction motor 15 is no longer necessary. As is known in the art, a piezoelectric transducer draws no current while maintaining a given pressure. Therefore, when the piezoelectric transducer 50 is activated and current flow to the stator windings 30 has been terminated, the system draws no current and, therefore, essentially no power is required to hold the rotor 35 at a given position.

In order to move the rotor 35 to a second stopping location, the piezoelectric transducer 50 is deactivated and current flow to the stator windings 30 is reinitiated. The rotor 35 rotates until it reaches a second stopping location whereupon the piezoelectric transducer 50 is once again activated. In this manner, the rotor 35 can be moved to and held at any position within its full range of motion.

The electronic braking apparatus 20 is relatively small and lightweight compared to the motor 15. The size and weight of the dynamically controlled motor 10 of the are, therefore, not changed substantially.

The addition of the braking apparatus 20 to the dynamically controlled motor 10 allows the operator to move the rotor 35 and hold it at any position. The electronic braking apparatus of the present invention also (stores no excess magnetic energy as with magnetic dents), thereby reducing the damage caused by vibrations of the rotor 35.

Figure 4:
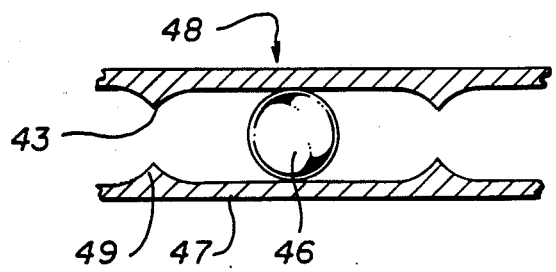
FIG. 4 shows torque bumps created in the solid lubricant by repeated movement of a bearing.

FIG. 4 is a cross sectional view of the bearing assembly 44 or 45 after the assembly has been subject to repeated rotation between small fixed angles. As the dynamically controlled motor 10 rotates the steel balls 46 of the bearing assemblies 44 and 45 cause a cumulative deformation of the solid lubricant 49. This deformation results in what is known as a torque bump 43. With repeated rotations between fixed angles, the torque bump 43 can become large enough to adversely affect the operation of the motor 10.

One method to correct the problems caused by the torque bump 43 is to periodically rotate the rotor 35 over a larger range of motion thereby smoothing the torque bump 43. At times, however, this maneuver may not be possible due to physical restrictions on the range of motion of the rotor 35.

Figure 5:
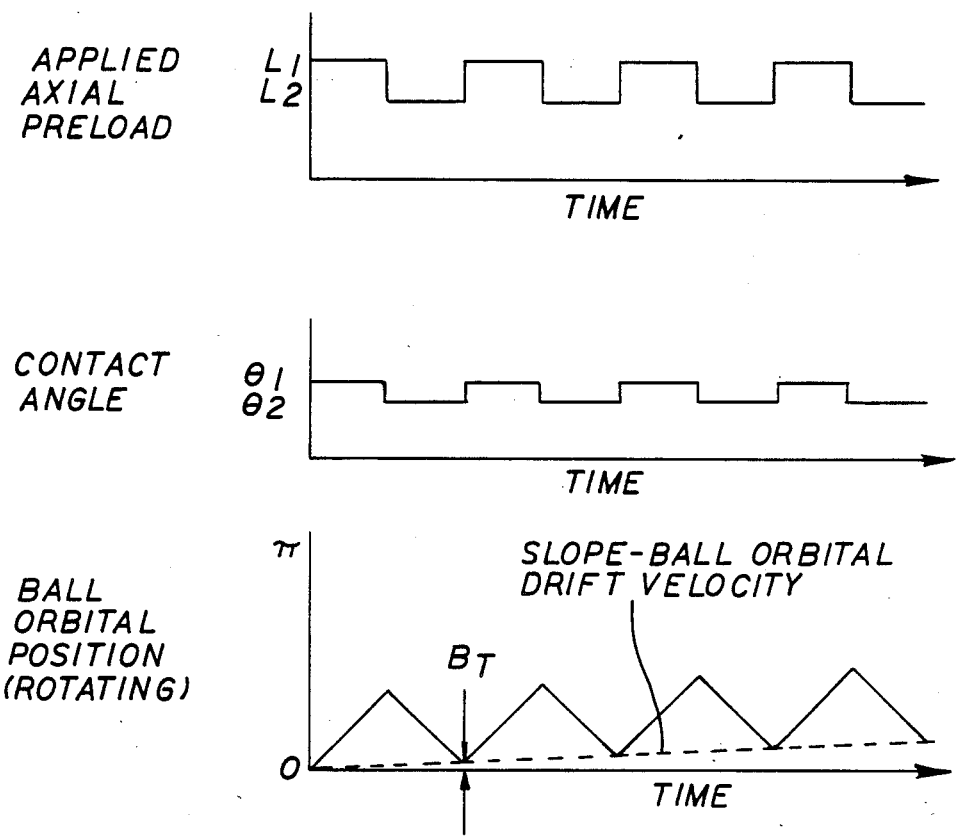
FIG. 5 shows graphs of the relationship between an applied preload, contact angle and the position of a ball within the bearing.

A second method for limiting the magnitude of the torque bump 43 is to apply a small preload to the bearings 44 and 45 by use of the electronic braking apparatus 20 as the rotor 35 is rotated in a first direction. The preload is the reduced or removed completely from the bearings 44 and 45 by reducing or removing the voltage applied to the piezoelectric transducer 50 of the electronic braking apparatus 20 as the rotor 35 is rotated in a second direction. FIG. 5 is a graph showing that this procedure causes the balls 46 within the bearings 44 and 45 to migrate around the outer race 48 and inner race 47. This migration limits the magnitude of the torque bumps 43 of the bearings 44 and 45.

Figure 6:
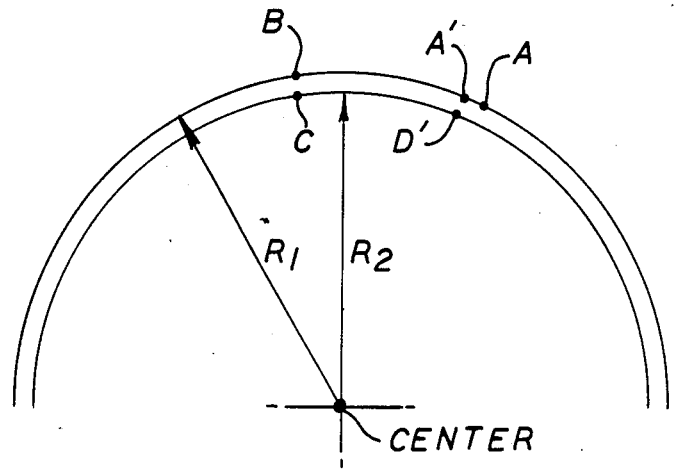
FIG. 6 shows the track of a ball within the bearing when the preload is applied as the bearing is rotated in one direction and removed as the bearing is rotated in the other direction.

FIG. 6 illustrates the improved method to reduce torque bumps of the present invention. As is known in the art, the contact angle of a ball within a race of a standard ball bearing assembly is a function of load. By using an electronic braking apparatus similar to that 20 of the present invention to apply a preload, the contact angle of the balls 46 with the race 47 and 48 of the bearing assemblies 44 and 45 can be controlled.

The contact angle of the balls 46 with the race 47 and 48 is determined, as the rotor 35 is moved in a first direction, by applying a preload and is changed as the rotor 35 is moved in a second direction by removing the preload. As the contact angle differs from the first direction of rotation to the second, but the angle of rotation is the same, the path length of the balls 46 will be different for the different directions of rotation. Therefore, by varying the preload applied to the bearings 44 and 45, the migration of the balls 46 of the bearings 44 and 45 can be controlled. This is illustrated in FIG. 6 where the initial position of the ball 46 is at position A with a preload applied. After the bearings 44 and 45 have rotated over a specified angle, ball 46 will occupy position B with preload applied. After the preload is removed from bearings 44 and 45, ball 46 will occupy position C. The bearings 44 and 45 are the rotated back the same specified angle and the ball 46 will the occupy position D. As the preload is re-applied, the ball 46 will occupy position $A_i$. In this manner, the ball 46 will migrate around the inner race 47 and the outer race 48 and torque bump production will be mitigated.

While the present invention has been described herein with reference to an illustrative embodiment and a particular application, it is understood that the invention is not limited thereto. Those having ordinary skill in the art and access to the teachings of the present invention will recognize additional modifications and applications within the scope thereof. For example, a D.C. motor could be used in place of the induction motor in the embodiment described without deviating from the scope of the invention.

Thus, it is intended by the appended Claims to cover any and all such modifications, applications and embodiments within the scope of the invention.

Accordingly,

What is claimed is:

1. An improved dynamically controlled motor, said dynamically controlled motor including;
    rotor means for supporting a payload and for supporting rotor windings;
    housing means for supporting said rotor means and for supporting stator windings;
    bearing means for suspending said rotor means within said housing means while allowing said rotor means to rotate freely with respect to said housing means;
    a piezoelectric transducer positioned between said housing means and said bearing means, said piezoelectric transducer applying pressure to said bearing means thereby supplying a braking force to said rotor means.

2. A method for dynamic control of a motor including a motor housing, a rotor which rotates with respect to said motor housing and bearing means for connecting said rotor to said motor housing while allowing the free movement of said rotor with respect to said motor housing, said method including the steps of:
    (a) providing a motor housing including stator windings;
    (b) providing a rotor including rotor windings and carrying a payload if desired;
    (c) providing bearing means for connecting said rotor to said motor housing while allowing the free movement of said rotor with respect to said motor housing;
    (d) providing a piezoelectric transducer between said motor housing and said bearing means;
    (e) rotating said rotor to a desired location;
    (f) activating said piezoelectric transducer thereby producing a force between said motor housing and said bearing means to hold said rotor at the desired location; and
    (g) deactivating said piezoelectric transducer to allow said rotor to rotate to a second desired location.

3. A method for controlling the path of balls within an oscillatory bearing, said bearing consisting of a series of balls contained within a first and second surface, said bearings supporting a rotating shaft, said method including the steps of:
    (a) providing a housing means to contain said bearing while allowing said shaft to rotate freely;
    (b) providing a piezoelectric transducer between said first surface and said housing means;
    (c) providing a preload to said bearing while said shaft is rotated in a first direction by activating said piezoelectric transducer; and
    (d) reducing said preload to said bearing while said shaft is rotated in a second direction by deactivating said piezoelectric transducer.

* * * * *